United States Patent
Benjamin

[15] 3,680,120
[45] July 25, 1972

[54] AIRCRAFT LANDING RADIO GUIDANCE RECEIVER WHICH WARNS OF SIGNAL REFLECTIONS

[72] Inventor: John Benjamin, Farnborough, England

[73] Assignee: Minister of Technology in Her Britannic Majesty's Government of the United Kingdom of Great Britain and Northern Ireland, London, England

[22] Filed: May 8, 1970

[21] Appl. No.: 35,870

[30] Foreign Application Priority Data

May 9, 1969 Great Britain......................23,734/69

[52] U.S. Cl.............................................343/109, 325/363
[51] Int. Cl........................................................G01s 1/14
[58] Field of Search.......................343/108 R, 109; 325/363

[56] References Cited

UNITED STATES PATENTS 2,930,891  3/1960  Lakatos..................................325/329
3,308,466  3/1967  Benjamin..............................343/109

Primary Examiner—Samuel Feinberg
Assistant Examiner—R. Kinberg
Attorney—Hall, Pollock & Vande Sande

[57] ABSTRACT

Receiver apparatus for use in an aircraft landing radio guidance system, including means for deriving beat frequencies from combinations of the upper-sideband components of a received guidance signal, means for deriving beat frequencies from combinations of the lower-sideband components of the received guidance signal, and comparison means for detecting and indicating a discrepancy between the upper-sideband beat-frequencies and the lower-sideband beat-frequencies. The apparatus may comprise sideband filter circuits, two mixer circuits, a phase-sensitive detector and a threshold circuit.

2 Claims, 3 Drawing Figures

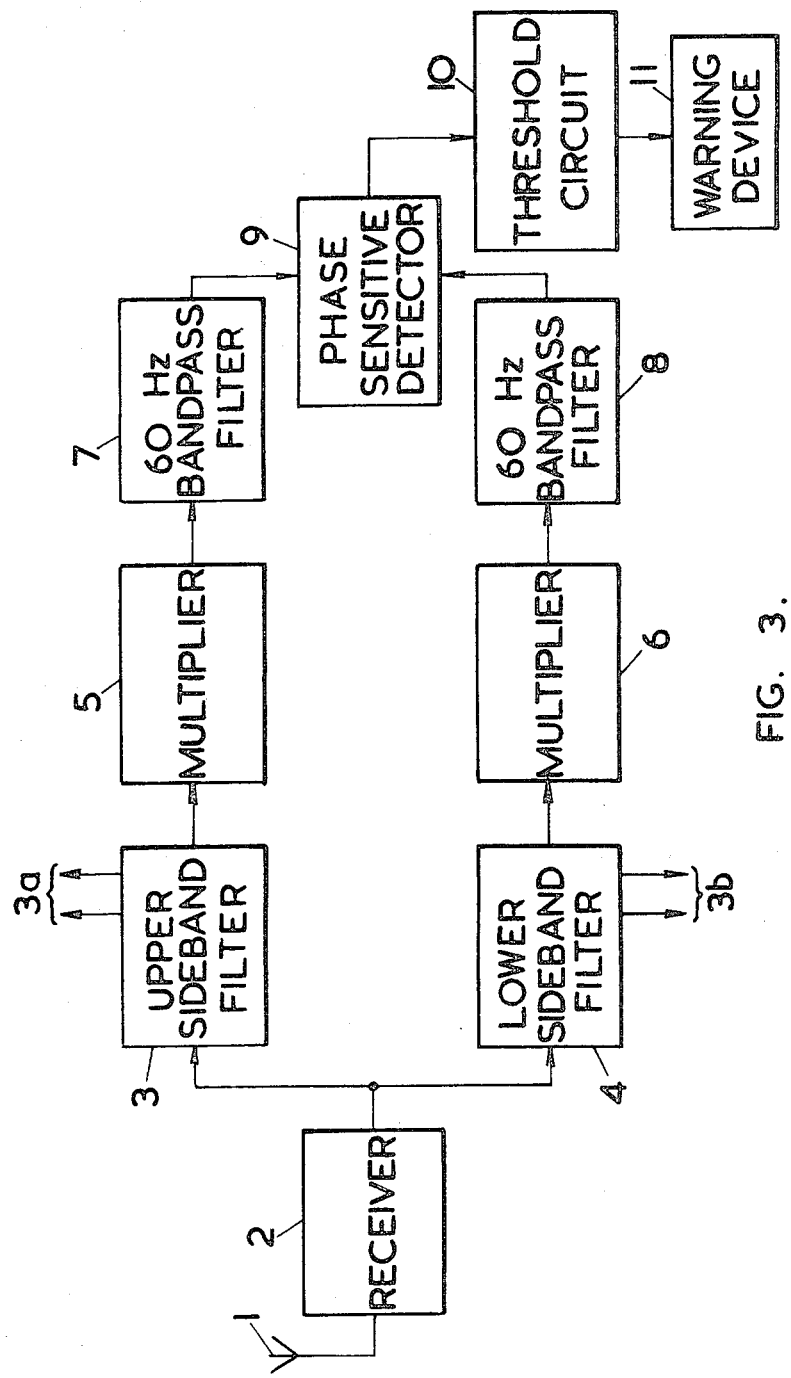

3,680,120

AIRCRAFT LANDING RADIO GUIDANCE RECEIVER WHICH WARNS OF SIGNAL REFLECTIONS

BACKGROUND OF THE INVENTION

The invention relates to improvements in receivers for a radio approach system for aircraft landing, of the type which yields two double sideband guidance signals the relative amplitudes of which are intended to be a measure of the position of a receiver relative to a preferred approach path. One such system is the well-known I.L.S. aircraft landing system, in which the two guidance signals have the same carrier frequency but different modulation frequencies. In the localizer section of an I.L.S. system, a pair of radio beams with radiation patterns overlapping in azimuth is commonly used. One radio beam is formed by a carrier wave, amplitude modulated at 90 Hz, while the other is formed by another wave of the same carrier frequency but amplitude modulated at 150 Hz. The transmissions are arranged so that, at all points on the preferred azimuthal approach path, signals of equal strength should be received from both radio beams. I.L.S. receivers are arranged to compare the depth of modulation at 90 Hz with the depth of modulation at 150 Hz. The difference in depths of modulation is assumed to indicate the relative strengths of the signals received from the two radio beams and hence the azimuthal approach angle of the aircraft.

If any equipment fault or interference due to atmospheric conditions, reflected radiations, or radiation from other sources, affects the apparent depth of modulation of one signal more than it affects the apparent depth of modulation of the other, a false indication may be given, with dangerous consequences.

While the localizer section of an I.L.S. system defines the approach path in azimuth, the glide path section of the system defines the approach path in elevation. The glide path section of the system works on the same principle as the localizer section, and is subject to the same type of error.

It is desirable to provide an I.L.S. receiver arranged to give warning of interference effects which might be causing incorrect indications. U.S. Pat. No. 3,308,466 (J. Benjamin) describes ILS receivers including means for obtaining separate measurements of divergence from a preferred approach path from the upper sideband components and from the lower sideband components respectively of two double sideband guidance signals, and means for indicating a discrepancy between the said separate measurements. It has been found that while such receivers give a highly desirable protection against effects of equipment faults and interfering signals from other sources, some further arrangements specifically designed to distinguish and give warning of dangerous reflections of the I.L.S. guidance signals are desirable. Dangerous reflections of the guidance signals may be caused by buildings or other structures erected on the ground, or by passing aircraft.

SUMMARY OF THE INVENTION

It is an object of the invention to provide improved aircraft landing radio guidance receivers, for distinguishing and giving warning of conditions wherein the reception of reflections of the guidance signals is tending to make the measurements dangerously inaccurate.

According to the present invention there is provided a receiver for use in an aircraft landing radio guidance system of the type which yields two double sideband guidance signals the relative amplitudes of which are intended to be a measure of the position of a receiver relative to a preferred approach path; including means for deriving beat frequencies from a combination of the upper sideband components of the guidance signals, means for deriving beat frequencies from the lower sideband components of the guidance signals, and comparison means for comparing the beat frequencies derived from the upper sidebands with the beat frequencies derived from the lower sidebands and for indicating a discrepancy between them. The comparison means may be a phase sensitive detector circuit. Each set of beat frequencies may be derived by separating out the required sideband components, by a narrow-bandpass filter or by any one of the more complex arrangements included in the circuits described in the aforesaid U.S. Pat. No. 3,308,466, and then applying them to a mixer or multiplier circuit constructed to pass the comparatively low beat-frequencies to its output.

BRIEF DESCRIPTION OF THE DRAWINGS

The invention will be further explained with reference to the accompanying drawings, of which:

FIG. 3 is a schematic circuit diagram of the localizer section of an I.L.S. receiver incorporating an embodiment of the invention.

DESCRIPTION OF THE PREFERRED EMBODIMENTS

Figure 1:
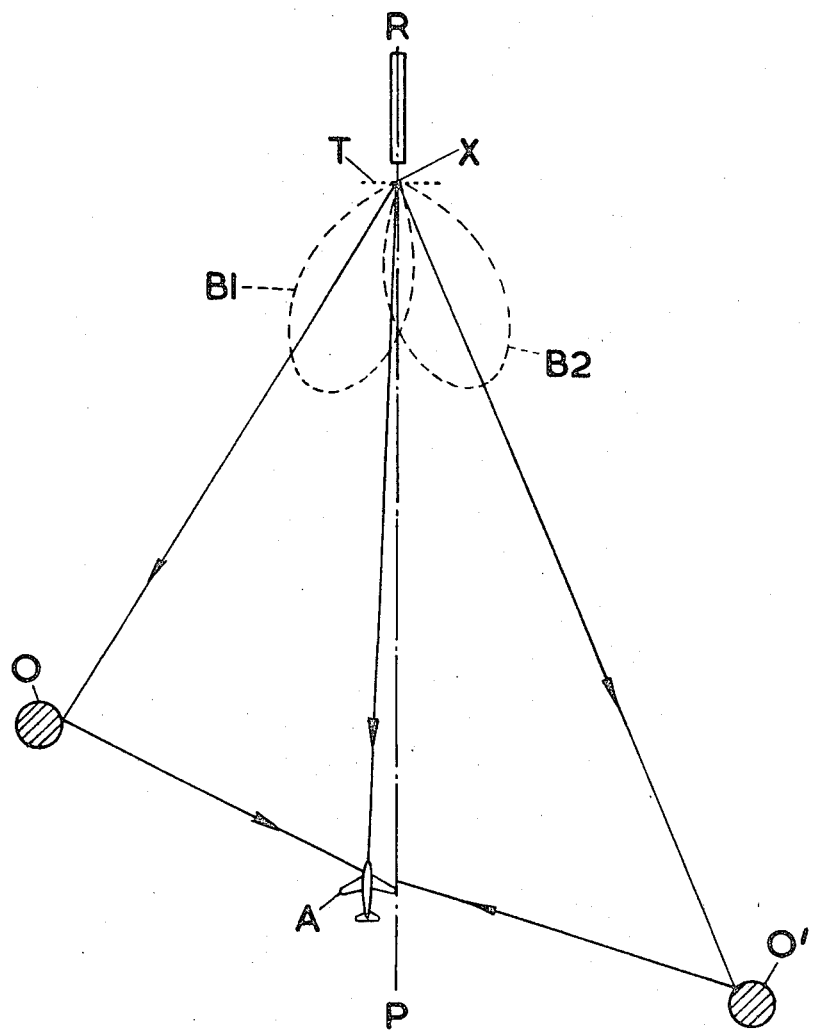
FIG. 1 is a diagrammatic map indicating the paths of radio signals received by an aircraft approaching a runway to land.

FIG. 1 shows the preferred approach path PR for aircraft approaching to land on a runway R, with an I.L.S. localizer transmitter aerial array T. The aerial array T comprises a line of aerials, of the kind described in U.S. Pat. No. 3,283,325 (S.S.D. Jones) intersecting the preferred approach path PR at a point X. The array T and the I.L.S. localizer transmitter (not shown) which feeds it are arranged to radiate guidance signals comprising a first beam signal modulated at 90Hz and a second beam signal modulated at 150 Hz. In FIG. 1 the curve B1 represents the main lobe of the ground-plane polar directivity curve of the first beam; that is to say the strength of the first beam signal varies with azimuthal bearing from X as the distance of the curve B1 measured radially from X. Similarly the curve B2 represents the main lobe of the ground-plane polar directivity curve of the second beam. The beams overlap in azimuth so that the curves B1 and B2 intersect in the direction of the part PX of the approach path, and the curve B2 can be considered effectively a mirror image of the curve B1 with respect to the line PR.

An aircraft A is shown approaching the runway R, slightly offset from the preferred approach path PR. The line XA indicates the direct path by which the guidance signals from the transmitter array T reach the aircraft A. Two reflecting objects O and O$^1$, which may be buildings or structures erected on the ground, or may be other aircraft, are also shown with lines XOA, XO$^1$A indicating indirect paths by which reflections of the guidance signals may reach the aircraft A.

Figure 2:
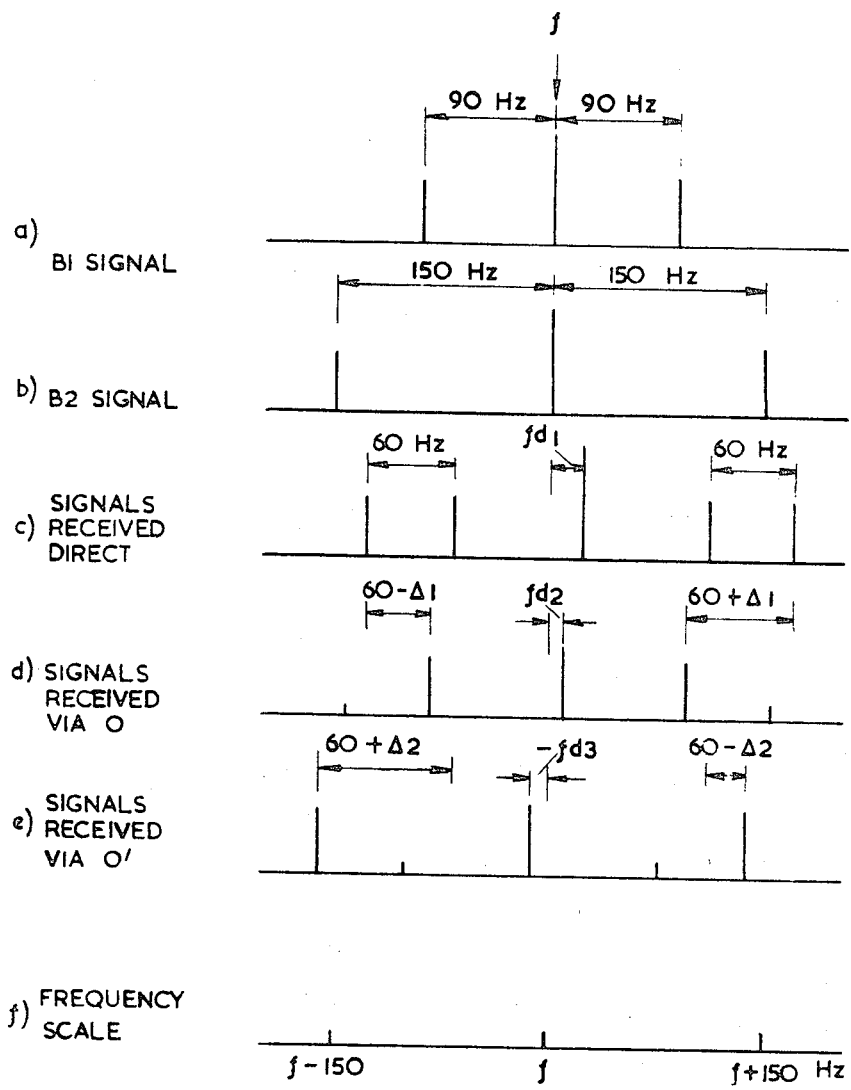
FIG. 2 is a graphical representation of the spectra of various signals involved in the situation illustrated by FIG. 1, all plotted against a common horizontal frequency scale.

FIG. 2 shows the spectrum of the guidance signals of the first beam (hereinafter called the B1 signals) at (a) and the spectrum of the guidance signals of the second beam (hereinafter called the B2 signals) at (b). At (c) is shown the combined spectrum of the signals received on the aircraft A via the direct path XA. Due to the motion of the aircraft towards the runway R the signal components are received with a Doppler frequency shift $f_{d1}$, which may be about 25 Hz.

At (d) in FIG. 2 there is shown the spectrum of the guidance signals received in the aircraft A by reflection via the object O. These signals are phase delayed with respect to the directly received signals, because they have travelled a longer path, and they are received with a different Doppler shift $f_{d2}$ which depends on the rate of change of the path length XOA. Signals received via a reflecting object in the hemisphere ahead of the aircraft A (for instance the object O) will have a Doppler shift which is positive (that is to say towards higher frequencies) but generally less than the shift $f_{d1}$. Reflections from an object (for instance O$^1$) in the hemisphere behind the aircraft A will generally have a negative Doppler shift. However, if the reflecting object is another aircraft, the velocity and direction of that aircraft will modify the Doppler shift. At (e) there is shown the spectrum of guidance signals received in the aircraft by reflection via the object O$^1$. It should be noted that, since the object O is to the lefthand-side of the approach path PR it is predominantly illuminated by the B1 signals, and the amount of 150 Hz modulation in the signals reflected from O is negligible. In contrast, since the object $O^1$ is to the righthand-side of the approach path PR it is predominantly illuminated by the B2 signals, and the amount of 90 Hz modulation in the signals reflected from $O^1$ is negligible.

The above-described spectra are all plotted against the common horizontal frequency scale shown at (f) in FIG. 2 in order that their relationships may be clearly appreciated. The carrier frequency of the guidance signals is denoted as f. Various frequency differences between components of the signals are particularly indicated and will be referred to hereinafter.

FIG. 3 shows relevant details of the receiver system carried in the aircraft A. An aerial 1 is connected to a conventional receiver 2 in which the carrier frequency of the signals is transposed to a lower frequency more convenient for filtering. The output of the receiver 2 is applied to an upper sideband filter 3 and to a lower sideband filter 4. Outputs of the filters 3 and 4 are connected to multiplier circuits 5 and 6 respectively. The filters also have outputs 3a and 3b which are connected to a modulation difference measuring system (not shown, preferably of the kind incorporated in the receiver systems described in the aforesaid U.S. Pat. No. 3,308,466). Outputs of the multiplier circuits 5 and 6 are connected through narrow-bandpass filters 7 and 8 respectively to the inputs of a phase sensitive detector circuit 9. The output of the phase sensitive detector circuit is connected to a threshold circuit 10 which is arranged to control a warning device 11.

In operation, the aerial 1 and receiver 2 receive the signals from the transmitter array T both via the direct path XA and the indirect paths XOA, $XO^1A$. The upper sideband components of the signals of the spectra at (c) (d) and (e) in FIG. 2 are passed together through the filter 3 to the multiplier circuit 5, while the lower sideband components of both these spectra are passed together through the filter 4 to the multiplier circuit 6. Each of the multiplier circuits 5 and 6 is a conventional circuit having non-linear characteristics, so that by intermodulation it develops beat-frequency output signals at frequencies equal to the differences between the frequencies of the signal components simultaneously applied to its input.

Consider first an ideal situation where there are no reflections and the signals are received by the direct path only. The interaction of the upper sideband components in the multiplier circuit 5 produces a difference-frequency output at a frequency of 60 Hz, while the interaction of the lower sideband components in the multiplier circuit 6 also produces a similar difference frequency output. Now, it is a characteristic of the I.L.S. guidance signals that the 90 Hz and 150 Hz modulations are derived from and phase-locked to a common source of frequency 30 Hz, and the sum of the 90 Hz modulation depth plus the 150 Hz modulation depth is substantially constant throughout the area in which the system is used. It can therefore be shown that the difference frequency signal produced by the interaction of the directly-received upper sideband components is of exactly the same frequency as the difference-frequency signal produced by the interaction of the directly-received lower sideband components, and their phase relationship is constant. Hence the difference-frequency signals applied to the phase-sensitive detector 9 will in this case be substantially balanced, producing either no output, or a 60 Hz signal which will be filtered by the output of the phase-sensitive detector circuit 9 so that it forms only a small steady direct-voltage output signal. In such conditions the warning device 11 is not operated.

However, when reflected signals are also received and applied to the multiplier circuits 5, 6 together with the directly-received signals, then further difference-frequency signals will also be generated by the interactions of various pairs of signal components. Considering the reception of signals by the direct path XA and via the object O (without any reflections from $O^1$) in the multiplier 6 of the lower-sideband channel, the reflected B1 signal component interacts with the directly received B2 signal to produce an output of frequency $(60 - \Delta1)$Hz, where $\Delta1$ is the difference between the Doppler shifts of the interacting signals $(f_{d1} - f_{d2})$. In the multiplier 5 of the upper sideband channel the reflected B1 signal component also interacts with the directly received B2 signal, in this case producing an output of frequency $(60 + \Delta1)$Hz. These signals are passed to the phase sensitive detector circuit 9; because of their frequency difference they will go periodically into phase and then out of phase with each other. The resulting output from the phase sensitive detector will therefore vary with the phase relationship of the signals applied to it, at frequency $2\Delta1$.

Considering the signals reflected from the object $O^1$ which will have a different Doppler shift $f_{d3}$, their interactions with the direct signals will develop a signal of frequency $(60 + \Delta2)$Hz in the multiplier 6 of the lower sideband channel and a signal of frequency $(60 - \Delta2)$Hz in the multiplier 5 of the upper sideband channel, where $\Delta2$ is the difference of the Doppler shifts of the interacting signals $(f_{d1} - f_{d3})$. These signals will be passed to the phase sensitive detector 9 where they will tend to produce signals of frequency $2\Delta2$.

The Doppler shifts $f_{d2}$ and $f_{d3}$ depend on the cosines of the angles between the line of flight of the aircraft A and the signal paths OA, $O^1A$, and these angles vary as the aircraft advances, so that the beat frequencies $\Delta1$ and $\Delta2$ will also be continually varying. It is therefore very unlikely that there will be any fortuitous balance between the beat-frequency signals developed, except perhaps instantaneously, even if reflections having opposite Doppler shifts are being received concurrently. It follows that the development of variable low-frequency signals at the output of the phase-sensitive detector circuit should reliably indicate the reception of reflected signals from one or more moving objects or stationary structures to either side of the approach path. The threshold circuit 10 and warning device 11 are arranged to give a warning indication when the amplitude of these low-frequency signals exceeds a predetermined level, this level being chosen to correspond to conditions in which the reflected signals may be tending to create a guidance inaccuracy approaching the tolerable limit.

Obviously, various modifications may be made to suit various applications of the invention. For instance, the beat-frequency signals may be compared by means other than a phase-sensitive detector circuit, and the filters 7 and 8 might be low-pass rather than band-pass. Receivers including an embodiment of the invention, for instance as hereinbefore described, may be used in conjunction with I.L.S. localizer transmitters of the alternative and more conventional type having two separate aerials, one for each beam, instead of the transmitter aerial array T. The invention may also be applied to the glide-path section of an I.L.S. receiver to give warning of any dangerous reflections of the glide-path guidance signals.

While FIG. 1 shows the transmitter aerial array T downwind of the runway R, the invention is equally useful where the guidance signal transmitter is in the more conventional upwind position at the other end of the runway R.

I claim:

1. Receiver apparatus for use in an aircraft landing radio guidance system of the type which provides two double-sideband guidance signals, the relative amplitudes of which are intended to be a measure of the position of a receiver relative to a preferred approach path; the said apparatus comprising:

receiver means for receiving the two double-sideband guidance signals of the radio guidance system, sideband filter means connected to the receiver means, for separating the upper-sideband components of the said guidance signals from the lower-sideband components of the said guidance signals, a first signal multiplier means connected to receive the said upper-sideband components from the sideband filter means, for deriving beat-frequency signals from the said upper-sideband components, a second signal multiplier means connected to receive the said lowernsideband components from the sideband filter means, for deriving beat-frequency signals from the said lower-sideband components, and comparison means, connected to the first signal multiplier means and the second signal multiplier means, for comparing the upper-sideband beat-frequency signals with the lower-sideband beat-frequency signals and indicating a discrepancy between them.

2. Receiver apparatus as claimed in claim 1 and wherein the comparison means comprises a phase-sensitive detector having one input connected to receive the upper-sideband beat-frequency signals from the first signal multiplier means, another input connected to receive the lower-sideband beat-frequency signals from the second signal multiplier means, and an output, a threshold circuit connected to the output of the phase-sensitive detector, and an indicator connected to the threshold circuit.

* * * * *